United States Patent [19]

Hamazaki et al.

[11] Patent Number: 5,322,908

[45] Date of Patent: Jun. 21, 1994

[54] RESIN COMPOSITION AND ADHESIVE USING THE SAME

[75] Inventors: Hirohide Hamazaki; Akira Fujiwara, both of Ichihara, Japan

[73] Assignee: Du Pont-Mitsui Polychemicals, Co., Ltd., Tokyo, Japan

[21] Appl. No.: 25,065

[22] Filed: Mar. 2, 1993

[30] Foreign Application Priority Data

Mar. 4, 1992 [JP] Japan ................... 4-46792

[51] Int. Cl.$^5$ ................ C08L 67/00; B32B 27/36; C08F 283/02
[52] U.S. Cl. ................... 525/445; 428/458; 428/480; 428/483
[58] Field of Search ........................ 525/445

[56] References Cited

U.S. PATENT DOCUMENTS

| | | | |
|---|---|---|---|
| 4,137,382 | 1/1979 | Vetter, Jr. | 525/445 |
| 4,767,806 | 8/1988 | Cesare et al. | 525/445 |
| 4,818,798 | 4/1989 | Gergen | 525/445 |
| 4,929,673 | 5/1990 | Laughner et al. | 525/63 |
| 4,962,164 | 10/1990 | Jabarin et al. | 525/445 |
| 5,079,316 | 1/1992 | Sun et al. | 525/63 |

FOREIGN PATENT DOCUMENTS 60-158282  8/1985  Japan .

Primary Examiner—Vasu S. Jagannathan
Attorney, Agent, or Firm—Varndell Legal Group

[57] ABSTRACT

Disclosed is a resin composition comprising 20 to 90 parts by weight of an ethylene/(meth)acrylic ester/carbon monoxide terpolymer having been graft modified with an unsaturated carboxylic acid or its anhydride and 80 to 10 parts by weight of a polyester elastomer having been graft modified with the above modifier, the total amount of said graft modified ethylene/(meth)acrylate/carbon monoxide terpolymer and polyester elastomer being 100 parts by weight. Also disclosed is an adhesive comprising the above-mentioned resin composition. The resin composition and the adhesive according to the invention are excellent in adhesion properties, heat resistant adhesive properties, hue and heat stability.

4 Claims, No Drawings

RESIN COMPOSITION AND ADHESIVE USING THE SAME

FIELD OF THE INVENTION

The present invention relates to novel resin compositions and adhesives comprising the same. More particularly, the invention relates to resin compositions excellent in adhesion properties, heat resistant adhesive properties, hue and heat stability, and also relates to adhesives using the same.

BACKGROUND OF THE INVENTION

Polyvinyl chloride resins are known as substrates having poor adherend properties, and it is difficult to thermally adhere these polyvinyl chloride resins to different materials such as other thermoplastic resins and metals.

It has been conventionally known that some of thermoplastic resins show thermal adhesion properties to polyvinyl chloride. However, most of these resins are insufficient in adhesion to other thermoplastic resins or metals, and they cannot withstand uses as adhesives depending on cases.

By the way, a graft modified product of an ethylene/vinyl acetate/carbon monoxide terpolymer (modified terpolymer) proposed by the present applicant in Japanese Patent Laid-Open Publication No. 60(1985)-158282 exhibits good adhesion to various adherends including polyvinyl chloride, and it can be used as an excellent adhesive. However, this adhesive has been desired to be much more improved in the practical use. That is, this adhesive (graft modified product) is easily colored in the preparation thereof and is hardly obtained as a colorless and transparent one, and hence there is yet room for improvement in the case of using this adhesive as an adhesive for adhering transparent substrates together. Further, it is difficult to use this adhesive in such a case that the adhesive is extruded together with high-melting materials such as polyamide and polyester, because the adhesive is not always sufficient in heat stability at high temperatures.

In the light of the foregoing, the present inventors have earnestly studied to pursue adherent resins having higher general-purpose properties, for example, capable of being used as the adhesion for polyvinyl chloride resin and other material, and as a result, they have found a novel modified terpolymer (graft modified product) which is by no means inferior to the aforementioned modified terpolymer in the adhesion properties and is excellent in other properties such as hue and heat stability. However, it has been also found that there is yet room for further improvement in this novel modified terpolymer in the heat resistant adhesive properties or adhesion to polyester, and therefore this adhesive is eagerly desired to be much more improved in those properties in order to increase general-purpose properties.

OBJECT OF THE INVENTION

It is an object of the present invention to provide a resin composition excellent in adhesion properties, heat resistant adhesive properties, hue and heat stability, and to provide an adhesive comprising this resin composition.

SUMMARY OF THE INVENTION

There is provided by the present invention a resin composition comprising 20 to 90 parts by weight of an ethylene/(meth)acrylic ester/carbon monoxide terpolymer having been graft modified with an unsaturated carboxylic acid or its anhydride and 80 to 10 parts by weight of a polyester elastomer, the total amount of said graft modified ethylene/(meth)acrylic ester/carbon monoxide terpolymer and said polyester elastomer being 100 parts by weight.

There is also provided by the present invention a resin composition obtained by graft modifying 20 to 90 parts by weight of an ethylene/(meth)acrylic ester/carbon monoxide terpolymer and 80 to 10 parts by weight of a polyester elastomer with an unsaturated carboxylic acid or its anhydride, the total amount of said ethylene/(meth)acrylic ester/carbon monoxide terpolymer and said polyester elastomer being 100 parts by weight.

An adhesive comprising any of these resin compositions is excellent in adhesion properties, heat resistant adhesive properties, hue and heat stability.

DETAILED DESCRIPTION OF THE INVENTION

The resin composition and the adhesive according to the present invention are described in detail hereinafter.

FIRST RESIN COMPOSITION

A first resin composition of the invention comprises an ethylene/(meth)acrylic ester/carbon monoxide terpolymer having been graft modified with an unsaturated carboxylic acid or its anhydride (i.e., modified terpolymer) and a polyester elastomer.

Modified Terpolymer

An ethylene/(meth)acrylic ester/carbon monoxide terpolymer (also referred to as "terpolymer" hereinafter), that is a base polymer of the ethylene/(meth)acrylic ester/carbon monoxide terpolymer having been graft modified with an unsaturated carboxylic acid o its anhydride (modified terpolymer), is a terpolymer comprising ethylene constituent units in an amount of usually 30 to 94% by weight, preferably 50 to 85% by weight, carbon monoxide constituent units in an amount of 3 to 20% by weight, preferably 5 to 15% by weight, and acrylic ester constituent units and/or methacrylic ester constituent units in an amount of 3 to 50% by weight, preferably 5 to 40% by weight. In this terpolymer, those constituent units are arranged at random.

Examples of constituent units derived from esters of acrylic acids or methacrylic acids, which are one kind of the constituent units for forming the copolymer, include those derived from alkyl esters having about 1 to 10 carbon atoms such as methyl acrylate, ethyl acrylate, isobutyl acrylate, n-butyl acrylate, n-octyl acrylate, isooctyl acrylate, 2-ethylhexyl acrylate, methyl methacrylate and n-butyl methacrylate. Particularly, constituent units derived from alkyl esters of acrylic acids are preferably used.

When the amount of the ethylene constituent units is larger than the above-mentioned amount and the amount of the carbon monoxide constituent units or the (meth)acrylic ester constituent units is smaller than the above-mentioned amount, a composition finally obtained is sometimes reduced in the adhesion properties.

When the amount of the ethylene constituent units is smaller than the above-mentioned amount and the amount of the (meth)acrylic ester constituent units is larger than the above-mentioned amount, a composition finally obtained is sometimes deteriorated in heat distortion resistance. Further, when the amount of the carbon monoxide constituent units is larger than the above-mentioned amount, a composition finally obtained is sometimes reduced in weatherability, thereby to limit its applicable field.

The terpolymer which is to be graft copolymerized has a melt flow rate, as measured at 190° C. under a load of 2,160 g, of 0.1 to 3,000 g/10min, preferably 0.5 to 2,000 g/10min.

Such a copolymer (terpolymer) as mentioned above can be prepared by using ethylene, (meth)acrylic ester and carbon monoxide as monomers in amounts corresponding to the aforementioned contents of the constituent units, and copolymerizing them with each other.

The modified terpolymer used in the invention can be obtained by graft copolymerizing the above terpolymer with an unsaturated carboxylic acid or its anhydride.

Examples of the unsaturated carboxylic acid or its anhydride which is a graft component include acrylic acid, methacrylic acid, fumaric acid, itaconic acid, norbornene-2,5-dicarboxylic acid, maleic acid, and anhydrides of these acids (e.g., maleic anhydride, tetrahydrophthalic anhydride and norbornene-2,5-dicarboxylic anhydride).

Of these, maleic anhydride is most preferably used. In the case of using the maleic anhydride, physical properties of the resin composition can be prominently improved even if its grafting amount is small. The amount of the graft component grafted with the above-mentioned terpolymer is generally in the range of 0.01 to 5% by weight, preferably 0.05 to 3% by weight, though it varies depending on the kind of the graft component used.

The terpolymer can be graft copolymerized with the above-mentioned graft modifier, for example, by kneading the terpolymer and the graft component in the presence of an organic peroxide (radical initiator) such as 2,5-dimethyl-2,5-bis(t-butylperoxy)hexane under the melting condition of the terpolymer. Otherwise, the graft copolymerization of the terpolymer with the graft modifier can be carried out by mixing the graft component and the terpolymer dissolved in an appropriate solvent in the presence of the above-mentioned organic peroxide.

The organic peroxide is used in an amount of about 0.001 to 1 part by weight based on 100 parts by weight of the terpolymer. The graft copolymerization is carried out at a temperature not lower than the decomposition temperature of the organic peroxide, for example, a temperature of 150° to 300° C.

The modified terpolymer obtained as above is nearly colorless and excellent in heat stability at high temperatures. Further, this modified terpolymer shows good adhesion properties to various substrates.

A melt flow rate (measured at 190° C. under a load of 2,160 g) of the modified terpolymer obtained as above, though varies depending on the use application of the resin composition, is generally in the range of 0.1 to 3,000 g/10min, preferably 0.5 to 2,000 g/10min.

Polyester Elastomer

The first resin composition of the invention contains a polyester elastomer.

Examples of the polyester elastomer include a polyester/polyether elastomer and a polyester/polyester elastomer.

The polyester/polyether elastomer is an elastomeric polymer in which polyester hard segment units derived from a dicarboxylic acid comprising an aromatic dicarboxylic acid as a host component and from a diol comprising an aliphatic diol as a host component and soft segment units of polyoxyalkylene glycol having a molecular weight of about 300 to 6,000 are blockwise linked to each other. This polyester/polyether elastomer is commercially available under the trade names of Hytrel, Pelprene, etc.

Concrete examples of the aromatic dicarboxylic acids used for preparing the polyester/polyether elastomer include terephthalic acid and isophthalic acid, and concrete examples of the aliphatic diols used therefor include ethylene glycol and 1,4-butanediol.

Concrete examples of the polyoxyalkylene glycols include polyethylene glycol and poly-1,4-butanediol.

Among various polyester/polyether elastomers, preferably used in the invention is a block copolymer comprising polyoxyalkylene glycol units in an amount of usually 5 to 80% by weight, preferably 15 to 70% by weight, and having a melting point of 100° to 220° C., preferably 120° to 200° C., and a melt flow rate, as measured at 230° C. under a load of 2,160 g, of 0.1 to 1,000 g/10min, preferably 1 to 100 g/10min, though these values vary depending on the use purpose of the resin composition.

The polyester/polyester elastomer preferably used in the invention has the same natures as those of the above-mentioned polyester/polyether elastomer except that soft segment units of aliphatic polyester such as poly-ε-caprolactone or polybutylene adipate are contained instead of the polyoxyalkylene glycol units which are soft component units of the polyester/polyether elastomer. Such a polyester/polyester elastomer as mentioned above is commercially available under the trade name of, for example, Glylax.

The blending ratio between the modified terpolymer and the polyester elastomer can be widely changed depending on the purpose of the resin composition. In general, the modified terpolymer is used in an amount of 20 to 90 parts by weight and the polyester elastomer is used in an amount of 80 to 10 parts by weight, based on 100 parts by weight of the total amount of the modified terpolymer and the polyester elastomer. In the case of using the resin composition of the invention as an adhesive, the modified terpolymer is used in an amount of 30 to 70 parts by weight, preferably 40 to 60 parts by weight, and the polyester elastomer is used in an amount of 70 to 30 parts by weight, preferably 60 to 40 parts by weight. When the modified terpolymer and the polyester elastomer are used in the above-mentioned amounts, an excellent resin composition for adhesive having well balanced properties can be obtained.

Preparation of the First Resin Composition

The first resin composition of the invention comprising the modified terpolymer and the polyester elastomer can be prepared by melt blending the graft modified terpolymer and the polyester elastomer. The blending procedure is carried out at a temperature of 150° to 300° C.

SECOND RESIN COMPOSITION

The second resin composition of the invention is a resin composition obtained by modifying the above-described ethylene/(meth)acrylic ester/carbon monoxide copolymer (terpolymer) and polyester elastomer with the aforesaid unsaturated carboxylic acid or its anhydride.

In the preparation of the second resin composition of the invention, the ethylene/(meth)acrylic ester/carbon monoxide (terpolymer) is used in an amount of 20 to 90 parts by weight and the polyester elastomer is used in an amount of 80 to 10 parts by weight, based on 100 parts by weight of the total amount of the terpolymer and the polyester elastomer. In the case of using this resin composition as an adhesive, the terpolymer is used in an amount of 30 to 70 parts by weight, preferably 40 to 60 parts by weight, and the polyester elastomer is used in an amount of 70 to 30 parts by weight, preferably 60 to 40 parts by weight. When the terpolymer and the polyester elastomer are used in the above-mentioned amounts, an excellent resin composition for adhesive having well balanced properties can be obtained.

The second resin composition of the invention can be prepared, for example, by adding the unsaturated carboxylic acid or its anhydride to a blend of the terpolymer and the polyester elastomer so as to perform a graft reaction under the aforementioned grafting conditions.

Through the graft reaction under the grafting conditions, the terpolymer is modified by the graft component, and the grafting amount of the graft component is in the range of 0.01 to 5 % by weight, preferably 0.05 to 3% by weight. It is inferred that at least a part of the polyester elastomer is also modified.

For improving extrusion processability of the second resin composition, it is effective to add an ethylene/(meth)acrylic ester copolymer in a small amount during the above-mentioned graft reaction. Examples of the (meth)acrylic ester employable for the copolymer are those described before. The amount of the (meth)acrylic ester constituent units in the copolymer is in the range of 5 to 50% by weight, preferably 10 to 40% by weight.

For the effective improvement, this copolymer is added in an amount of not more than 40 parts by weight, preferably in the range of 2 to 20 parts by weight, based on 100 parts by weight of the total amount of the ethylene/(meth)acrylic ester/carbon monoxide copolymer and the polyester elastomer. As the amount of the copolymer is increased, the extrusion processability of the second resin composition is more improved. However, if this copolymer is used too much, an adverse effect is given to the adhesion performance of the resin composition.

Each of the first and second resin compositions of the invention may further contain various additives such as tackifying resins, waxes, antioxidants, weathering stabilizers, dyes, pigments, inorganic fillers, plasticizers, oils and slip agents, if desired.

ADHESIVE

Each of the first and second resin compositions of the invention is useful as an adhesive. In the case of using any of those resin compositions as a hot melt adhesive, the adhesive is applied onto an adherend generally using a hot melt applicator, a roll coater, etc., and therefore it is unfavorable that a melt viscosity of the adhesive is too high. Accordingly, a tackifying resin or the like is added to the resin composition if necessary so that the resin composition has a melt flow rate of not less than 100 g/10min when measured at 190° C. under a load of 2,160 g and has a melt viscosity at 180° C. of not more than 300,000 Pas, preferably not more than 200,000 Pas. In the case where the resin composition of the invention is adhered to an adherend by means of co-extrusion or extrusion coating, the resin composition is desirably adjusted to have a melt viscosity (melt flow rate measured at 190° C. under a load of 2,160 g) of usually 0.1 to 500 g/10min, preferably 0.5 to 100 g/10min. When the resin composition of the invention is used as an adhesive, other thermoplastic resins may be added thereto in a small amount.

Concrete examples of the thermoplastic resins include polyolefins such as polyethylene and polypropylene; and ethylene copolymers such as an ethylene/vinyl acetate copolymer, an ethylene/(meth)acrylic ester copolymer and an ethylene/(meth)acrylic ester/carbon monoxide terpolymer which is used as a starting material of the aforesaid modified terpolymer.

The resin compositions of the invention show good adhesion properties to various adherends. For example, they can be favorably used for halogenated olefin polymers such as polyvinyl chloride, polyvinylidene chloride, chlorinated polyethylene, chloroprene rubber and vinyl chloride type elastomer; olefin polymers such as polyethylene, polypropylene and an ethylene/propylene polymer; ethylene/polar monomer copolymers such as an ethylene/vinyl acetate copolymer, an ethylene/(meth)acrylic ester copolymer and an ethylene/vinyl alcohol copolymer; thermoplastic resins such as polyester, polycarbonate, polyamide, polystyrene and ABS resin; metals such as aluminum, copper, iron, stainless steel; and other adherends such as wood and paper. The resin compositions of the invention show good adhesion properties specifically to the halogenated olefin polymers, polyester, metals, wood and paper among those adherends.

EFFECT OF THE INVENTION

According to the present invention, there can be provided resin compositions having good adhesion properties, particularly heat resistant adhesive properties, and showing excellent hue and heat stability. Further, according to the invention, adhesives of various types can be provided by utilizing the above-mentioned properties of the resin compositions.

The adhesives are useful not only for adhesion between the same materials such as adhesion between polyvinyl chloride and polyvinyl chloride but also for adhesion between different materials such as adhesion between polyvinyl chloride and metal or between polyvinyl chloride and polyester.

EXAMPLE

The present invention is further described with reference to examples, but it should be construed the invention is in no way limited to those examples. In the following examples and comparative examples, the term "part(s)" means "part(s) by weight".

Example 1

100 parts of an ethylene/carbon monoxide/n-butyl acrylate terpolymer (ethylene: 60% by weight, carbon monoxide: 10% by weight, n-butyl acrylate: 30% by weight, melt flow rate measured by the later-described measuring method: 12 g/10min), 1 part of maleic anhydride and 0.2 part of 2,5-dimethyl-2,5-bis(t-butylperoxy)hexane (radical initiator) were pre-blended to give a homogeneous blend. This blend was then fed into an extruder (screw diameter: 30 mm, L/D: 32) at a feed rate of about 4 kg/hr to perform graft modification while keeping the temperature of the center of the extruder at 240° C.

A graft rate (measured by means of titration method) of the maleic anhydride graft modified product (modified terpolymer) obtained as above was 0.90% by weight (reaction rate of maleic anhydride: 90%) and a melt flow rate (abbreviated to "MFR" hereinafter) thereof measured at 190° C. under a load of 2,160 g in accordance with JIS K-6760 was 6 g/10min.

50 parts of the maleic anhydride graft modified product and 50 parts of a polyester elastomer (Hytrel, available from Du Pont, melting point: 153° C, MFR at 190° C.: 6 g/10min) were blended with each other to give a homogeneous blend, and this blend was melt kneaded using the above-mentioned extruder under the same kneading conditions as mentioned above.

The resin composition thus obtained was press molded at 180° C. to prepare a sheet having a thickness of 0.2 mm. The resin composition sheet thus prepared was sandwiched between two rigid polyvinyl chloride sheets each having a thickness of 1 mm, and they were heated at 180° C. for 10 seconds under an actual pressure of 1 kg/cm$^2$ to prepare a laminate.

The laminate thus obtained was cut to give a test strip having a width of 25 mm, and the test strip was measured on the T-peel strength under the conditions of a temperature of 23° C. and a tensile speed of 300 mm/min.

The result is set forth in Table 1.

Further, the above procedure was repeated except for varying the adherend substrate from the rigid polyvinyl chloride to semi-rigid aluminum (thickness: 0.1 mm) to prepare a laminate. The heat sealing conditions used herein were the same as mentioned above. A test strip obtained from the laminate was measured on the T-peel strength.

The result is set forth in Table 1.

Furthermore, the above procedure was repeated except for varying the adherend substrate to polyethylene terephthalate (PET, thickness: 0.1 mm) to prepare a test strip. The test strip was measured on the T-peel strength.

The result is set forth in Table 1.

The aforementioned resin composition sheet having a thickness of 0.2 mm was sandwiched between two pieces of kraft paper having a basis weight of 75 g/m$^2$, and they were heat-sealed under the same heat-sealing conditions as mentioned above to prepare a test strip. The test strip was measured on the adhesive failure temperature under shear under the conditions of a load of 1 kg and a rate of temperature rise of 24° C./hr in accordance with JIS K-6844.

Example 2

The result is set forth in Table 1.

The procedure of melt kneading in Example 1 was repeated except for varying the blending ratio between the maleic anhydride graft modified product and the polyester elastomer from 50 parts : 50 parts to 60 parts : 40 parts, to prepare a resin composition. The resin composition was measured on the T-peel strength against various substrates and the adhesive failure temperature under shear in the same manner as described in Example 1.

The results are set forth in Table 1.

Example 3

The procedure of melt kneading in Example 1 was repeated except for varying the blending ratio between the maleic anhydride graft modified product and the polyester elastomer from 50 parts : 50 parts to 40 parts : 60 parts, to prepare a resin composition. The resin composition was measured on the T-peel strength against various substrates and the adhesive failure temperature under shear in the same manner as described in Example 1.

The results are set forth in Table 1.

Example 4

The procedure of graft modification in Example 1 was repeated except for using an ethylene/carbon monoxide/n-butyl acrylate terpolymer having an ethylene content of 80% by weight, a carbon monoxide content of 15% by weight and a n-butyl acrylate content of 5% by weight and having a melt flow rate of 17 g/10min, instead of the ethylene/carbon monoxide/n-butyl acrylate terpolymer of Example 1, to prepare a maleic anhydride graft modified product.

The maleic anhydride graft modified product thus obtained had a graft rate of 0.90% by weight (reaction rate of maleic anhydride: 90%) and MFR of 10 g/10min.

The maleic anhydride graft modified product and a polyester elastomer (Hytrel 4056) were melt kneaded in a blending ratio therebetween of 50 parts : 50 parts in the same manner as described in Example 1, to prepare a resin composition. The resin composition was measured on the T-peel strength against various substrates and the adhesive failure temperature under shear in the same manner as described in Example 1.

The results are set forth in Table 1.

Example 5

A resin composition was prepared in the same manner as described in Example 1 except that the polyester elastomer used in Example 1 was varied from Hytrel 4056 to Hytrel 4767 (available from Du Pont-Toray, melting point: 199° C., MFR at 220° C.: 18 g/10min). The resin composition was measured on the T-peel strength against various substrates and the adhesive failure temperature under shear. In this case, a sheet of the resin composition was prepared by press molding the resin composition at 210° C., and lamination of this sheet with various substrates was carried out at a heat-sealing temperature of 210° C.

The results are set forth in Table 1.

Comparative Example 1

The maleic anhydride graft modified product of an ethylene/carbon monoxide/n-butyl acrylate terpolymer used in Example 1 was measured on the T-peel strength against various substrates and the adhesive failure temperature under shear.

The results are set forth in Table 1.

Comparative Example 2

The polyester elastomer (Hytrel 4056) used in Example 1 was measured on the T-peel strength against various substrates and the adhesive failure temperature under shear.

The results are set forth in Table 1.

Comparative Example 3

The procedure of melt kneading in Example 1 was repeated except for using an ethylene/carbon monoxide/n-butyl acrylate terpolymer (ethylene: 60% by weight, carbon monoxide: 10% by weight, n-butyl acrylate: 30% by weight, MFR: 12 g/10min) not having been graft modified with maleic anhydride instead of the graft modified terpolymer of Example 1, and setting a blending ratio between the above terpolymer and the polyester elastomer (Hytrel 4056) to 50 parts : 50 parts, to prepare a resin composition. The resin composition was measured on the T-peel strength against various substrates and the adhesive failure temperature under shear.

The results are set forth in Table 1.

Example 6

50 parts of an ethylene/carbon monoxide/n-butyl acrylate terpolymer (ethylene: 60% by weight, carbon monoxide: 10% by weight, n-butyl acrylate: 30% by weight, MFR: 12 g/10 min), 50 parts of a polyester elastomer (Hytrel 4056), 1 part of maleic anhydride and 0.2 part of 2,5-dimethyl-2,5-bis(t-butylperoxy)hexane (radical initiator) were pre-blended to give a homogeneous blend. This blend was then fed into an extruder (screw diameter: 30 mm, L/D: 32) at a feed rate of about 4 kg/hr to perform melt kneading and graft modification at the same time, while keeping the temperature of the center of the extruder at 240° C.

The resin composition obtained as above was measured on the T-peel strength against various substrates and the adhesive failure temperature under shear in the same manner as described in Example 1.

The results are set forth in Table 1.

Example 7

The procedure of Example 6 was repeated except for varying the amount of the maleic anhydride from 1 part to 0.3 part and the amount of the radical initiator from 0.2 part to 0.06 part, to prepare a resin composition.

The resin composition was measured on the T-peel strength against various substrates and the adhesive failure temperature under shear.

The results are set forth in Table 1.

Example 8

The procedure of Example 7 was repeated except that the resin composition to be graft modified was varied from the composition consisting of 50 parts of an ethylene/carbon monoxide/n-butyl acrylate terpolymer (ethylene: 60% by weight, carbon monoxide: 10% by weight, n-butyl acrylate: 30% by weight, MFR: 12 g/10min) and 50 parts of a polyester elastomer (Hytrel 4056) to a composition consisting of 45 parts of an ethylene/carbon monoxide/n-butyl acrylate terpolymer (ethylene: 60% by weight, carbon monoxide: 10% by weight, n-butyl acrylate: 30% by weight, MFR: 12 g/10min), 45 parts of a polyester elastomer (Hytrel 4056) and 10 parts of an ethylene/ethyl acrylate copolymer (ethylene: 75% by weight, ethyl acrylate: 25% by weight, MFR: 17 g/10min), to prepare a maleic anhydride graft modified resin composition.

The resin composition was measured on the T-peel strength against various substrates and the adhesive failure temperature under shear in the same manner as described in Example 1.

The results are set forth in Table 1.

Comparative Example 4

The procedure of Example 7 was repeated except that the resin composition to be graft modified was varied from the composition consisting of 50 parts of an ethylene/carbon monoxide/n-butyl acrylate terpolymer (ethylene: 60% by weight, carbon monoxide: 10% by weight, n-butyl acrylate: 30% by weight, MFR: 12 g/10min) and 50 parts of a polyester elastomer (Hytrel 4056) to a composition consisting of 50 parts of a polyester elastomer (Hytrel 4056) and 50 parts of an ethylene/ethyl acrylate copolymer (ethylene: 75% by weight, ethyl acrylate: 25% by weight, MFR: 17 g/10min), to prepare a maleic anhydride graft modified resin composition.

The resin composition was measured on the T-peel strength against various substrates and the adhesive failure temperature under shear in the same manner as described in Example 1.

The results are set forth in Table 1.

TABLE 1

| | T-peel strength against rigid polyvinyl chloride (kg/25 mm) | T-peel strength against semi-rigid aluminum (kg/25 mm) | T-peel strength against polyethylene terephthalate (kg/25 mm) | Adhesive failure temperature under shear (°C.) |
|---|---|---|---|---|
| Ex. 1 | 15.0 (cohesive failure) | 6.5 (interfacial peeling) | 6.8 (cohesive failure) | 133 |
| Ex. 2 | 14.0 (cohesive failure) | 6.3 (interfacial peeling) | 1.6 (interfacial peeling) | 83 |
| Ex. 3 | 8.0 (cohesive failure) | 4.7 (interfacial peeling) | 2.8 (interfacial peeling) | 156 |
| Ex. 4 | 12.0 (cohesive failure) | 5.5 (interfacial peeling) | 4.3 (interfacial peeling) | 140 |
| Ex. 5 | 12.0 (cohesive failure) | 2.7 (interfacial peeling) | 5.5 (interfacial peeling) | 171 |
| Comp Ex. 1 | 21.5 (cohesive failure) | 16.7 (cohesive peeling) | 1.6 (interfacial peeling) | 70 |
| Comp Ex. 2 | 3.0 (interfacial failure) | 2.6 (interfacial peeling) | 6.2 (interfacial peeling) | 167 |
| Comp Ex. 3 | 12.0 (cohesive failure) | 1.1 (interfacial peeling) | 0.7 (interfacial peeling) | 90 |
| Ex. 6 | 6.2 (interfacial failure) | 9.5 (cohesive peeling) | 8.0 (cohesive peeling) | 153 |
| Ex. 7 | 10.0 (cohesive failure) | 6.2 (interfacial peeling) | 7.3 (cohesive peeling) | 139 |
| Ex. 8 | 15.0 | 4.4 | 8.0 | 149 |

TABLE 1-continued

| | T-peel strength against rigid polyvinyl chloride (kg/25 mm) | T-peel strength against semi-rigid aluminum (kg/25 mm) | T-peel strength against polyethylene terephthalate (kg/25 mm) | Adhesive failure temperature under shear (°C.) |
|---|---|---|---|---|
| Comp Ex. 4 | (cohesive failure) 2.3 (interfacial failure) | (interfacial peeling) 4.4 (interfacial peeling) | (cohesive peeling) 5.8 (cohesive peeling) | 149 |

What is claimed is:

1. A resin composition is obtained by graft modifying:
   20 to 90 parts by weight of an ethylene/(meth)acrylic ester/carbon monoxide terpolymer which has a melt flow rate of 0.1 to 3,000 g/10 min at 190° C. under a load of 2,160 g, said terpolymer comprising of 30 to 94% by weight of ethylene constituent units, 3 to 20% by weight of carbon monoxide constituent units and 3 to 50% by weight of (meth)acrylic ester constituents units and
   80 to 10 parts by weight of a polyester elastomer with an unsaturated carboxylic acid or its anhydride, the total amount of said ethylene/(meth)acrylic ester/carbon monoxide terpolymer and said polyester elastomer being 100 parts by weight.

2. The resin composition of claim 1, wherein said unsaturated carboxylic acid or its anhydride is present in an amount of 0.01 to 5% by weight.

3. An adhesive comprising a resin composition obtained by graft modifying:
   20 to 90 parts by weight of an ethylene/(meth)acrylic ester/carbon monoxide terpolymer which has a melt flow rate of 0.1 to 3,000 g/ min at 190° C. under a load of 2,160 g, said terpolymer comprising 30 to 94% by weight of ethylene constituent units, 3 to 20% by weight of carbon monoxide constituent units and 3 to 50% by weight of (meth)acrylic ester constituents units and
   80 to 10 parts by weight of a polyester elastomer, with an unsaturated carboxylic acid or its anhydride, the total amount of said ethylene/(meth)acrylic ester/carbon monoxide terpolymer and said polyester elastomer being 100 parts by weight.

4. The adhesive claim 3, wherein said unsaturated carboxylic acid or its anhydride is present in an amount of 0.01 to 5% by weight.

* * * * *